(12) United States Patent
Panje

(10) Patent No.: US 11,463,766 B2
(45) Date of Patent: Oct. 4, 2022

(54) PROVIDING ALTERNATIVE ADVERTISING CONTENT

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/466,771

(22) Filed: Sep. 3, 2021

(65) Prior Publication Data

US 2022/0070529 A1 Mar. 3, 2022

Related U.S. Application Data

(60) Provisional application No. 63/074,013, filed on Sep. 3, 2020.

(51) Int. Cl.
*H04N 21/44* (2011.01)
*H04N 21/458* (2011.01)
*H04N 21/81* (2011.01)
*H04N 21/845* (2011.01)

(52) U.S. Cl.
CPC ..... *H04N 21/44016* (2013.01); *H04N 21/458* (2013.01); *H04N 21/812* (2013.01); *H04N 21/8455* (2013.01)

(58) Field of Classification Search
CPC ........... H04N 21/44016; H04N 21/458; H04N 21/812; H04N 21/8455; H04N 21/23424; G06Q 30/0251
See application file for complete search history.

(56) References Cited

U.S. PATENT DOCUMENTS

2010/0088716 A1 4/2010 Ellanti et al.
2016/0353159 A1* 12/2016 Prabu ................. H04N 21/4345
2019/0349615 A1* 11/2019 Milford ................ H04N 21/234

OTHER PUBLICATIONS

Hurst et al., "MPEG Splicing—Tutorial and Proposed SMPTE Standard", Proceedings of the SMPTE Tecnical Conference, Nov. 1, 1997 (Nov. 1, 1997), pp. 105-117, XP002098562, the whole document.
International Search Report and Written Opinion RE: Application No. PCT/US2021/049106, dated Dec. 8, 2021.

* cited by examiner

*Primary Examiner* — Anthony Bantamoi
(74) *Attorney, Agent, or Firm* — Chernoff, Vilhauer, McClung & Stenzel, LLP

(57) ABSTRACT

Methods and systems of providing alternative targeted advertising (TAD) content are shown and disclosed. In one embodiment, the method includes outputting a first TAD content during a TAD window, and receiving at least one user input requesting different TAD content during the TAD window. The method additionally includes outputting the different TAD content instead of the first TAD content during the TAD window after at least one predetermined amount of time from start of the TAD window in response to the at least one user input. In some embodiments, the method may further include re-outputting the first TAD content instead of the different TAD content during the TAD window in response to receiving user input requesting different TAD content when the predetermined amount of time associated with each of the different TAD content already has elapsed before receiving the user input.

16 Claims, 4 Drawing Sheets

PROVIDING ALTERNATIVE ADVERTISING CONTENT

CROSS REFERENCE TO RELATED APPLICATIONS

This application claims the benefit of U.S. Provisional Patent Application Ser. No. 63/074,013 filed Sep. 3, 2020.

BACKGROUND

The subject matter of this application relates to providing advertising content in multimedia streams, in particular systems and methods of providing alternative advertising content, such as targeted advertising content, when requested by users and/or customers.

Targeted Advertising (TAD) technology is used by Multiple System Operators (MSOs) and content producers to enhance revenue generation. For example, several MSOs use splicing or tuned transitions to jump from network content to advertisement content and vice-versa. Multiple advertisements are used for a particular advertisement time slot, which are intended or targeted for different customer set top boxes based on the customers' profiles. The multiple advertisements may be in the same channel transport streams and/or may be in different channels. Advertisement client software applications (or TAD applications) generally tune to an advertisement-based user profile or MSO set preference when the time slot or TAD window for the advertisement arrives. If the customer attempts to tune to a different channel during the TAD window, the TAD application may force the customer to stay on the TAD channel and may tune to the customer's request channel only when the TAD window has passed or has ended.

However, the customer or user is not always interested in the TAD content pre-selected for a particular TAD window, such as based on the customer's profile. What is desired, therefore, are systems and/or methods of providing alternative advertising content, such as targeted advertising, that may be provided when requested by the customer.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
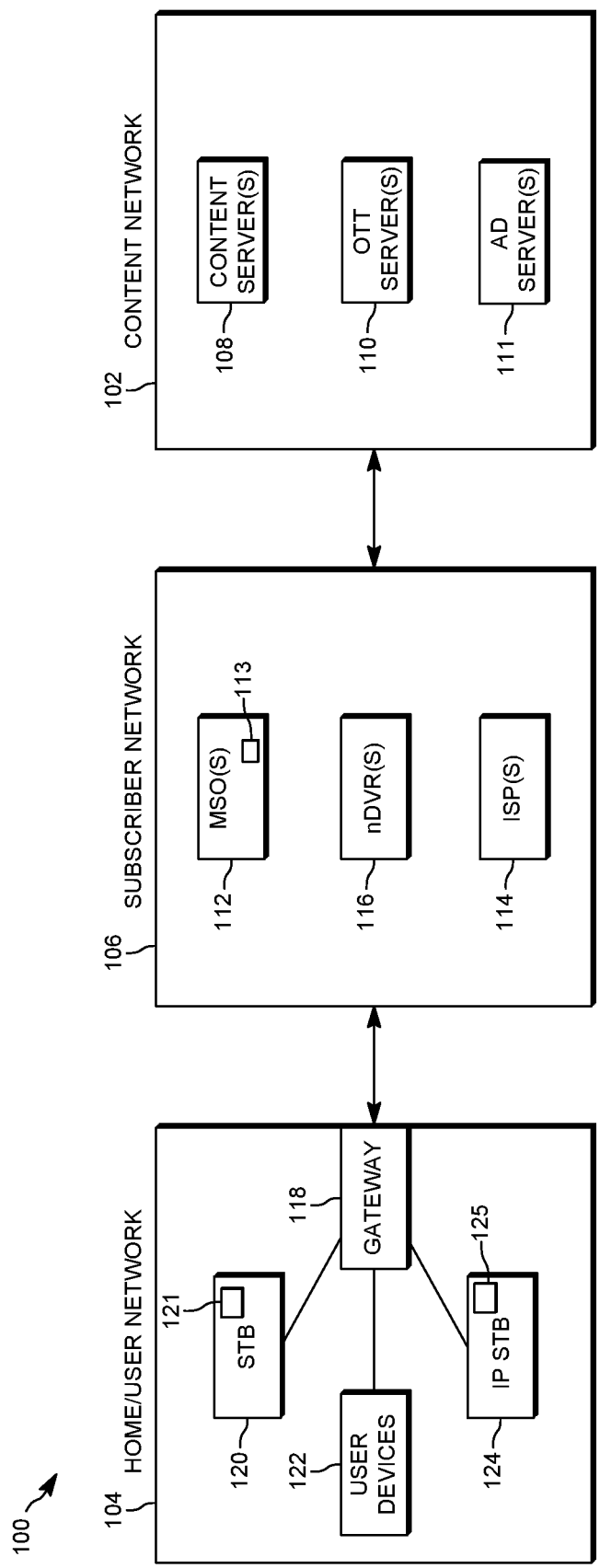
FIG. 1 is a high-level block diagram of an example of a network for providing alternative advertising content.

Referring to FIG. 1, an example network environment 100 for providing content from a content network 102 to a home or user network 104 via a provider, access, or subscriber network 106, and for managing advertising content viewed by customers in the home or user network. Content includes any type of video or audio media, such as movies, television shows, music, radio, advertisements, etc.

Content network 102 includes one or more content servers 108, one or more over-the-top servers 109, and one or more advertisement servers 110. The content, over-the-top, and advertisement servers store content that is provided to home network 104. Content server(s) 108 provide content via a multiple system operator (MSO) and/or an internet service provider. Over-the-top servers (OTT) 109 provide content only via over the top streaming for at least one client device of the home network. Advertising server(s) 110 provide advertising content, such as targeted advertising content.

Subscriber network 106 includes one or more Multiple System Operator (MSO) systems 112, which includes multiple cable TV systems and/or direct satellite TV systems. For example, MSO system 112 may include one or more headends, regional headends, a network architecture of fiber optic, twisted pair, and/or co-axial lines, and/or amplifiers. In some embodiments, MSO system 112 includes an advertisement splice points component or apparatus 113, which includes software, hardware, and/or firmware capable of inserting splice points in advertisements and alternative advertisements, such as the main advertisement and staggered alternative advertisements discussed below. Subscriber network 112 also includes one or more Internet Service Providers (ISP) 114. Each ISP 114 includes a Point of Presence (POP) that connect to Network Access Points (NAP), such as via routers and a T3 backbone. In the example shown in FIG. 1, subscriber network 106 includes one or more network Digital Video Recorders (nDVRs) 116, which may be part of and/or separate from MSO systems 112. Various content from content network 102 may be recorded and/or stored on nDVRs 116 based on requests made by users or subscribers. Subscriber network 106 may include other components not explicitly shown in FIG. 1, such as transcoders, streamers, just-in-time (JIT) packagers, etc.

Home/user network 104 includes a gateway 118, a set top box 120, user devices 122, and an Internet Protocol (IP) set top box 124. Set top box 120 is operable to connect to a television to deliver television services through traditional terrestrial, satellite, and cable formats. Set top box 120 may include a digital video recorder (DVR) (not shown) and/or may have a graphic user interface (GUI) that may be assessed by the user via the television to which set top box 120 is connected. In other embodiments, the DVR may be separate from set top box 120. In some embodiments, set top box 120 may include an advertising management component or apparatus 121, which includes software, hardware, and/or firmware that monitors splice points in advertisements and alternative advertisements and allows a customer or user to select alternative advertisements or additional alternative advertisements, such as targeted advertisements, during advertisement windows or periods.

User devices 122 may be any device that may receive content, such as smart phones, mobile phones, tablet computers, smart watches and other wearables, gaming systems, etc. The user devices may have a GUI that may be accessed by the user via the screen on the device. IP set top box 124 is operable to connect to a television over the Internet instead of being delivered through traditional terrestrial, satellite, and cable formats. The IP set top box may include a digital video recorder (DVR) (not shown) and/or may have a GUI that may be accessed by the user via the television to which the IP set top box is connected. In other embodiments, the DVR may be separate from IP set top box 124. In some embodiments, IP set top box 124 may include an advertising management component or apparatus 125, which includes software, hardware, and/or firmware that monitors splice points in advertisements and alternative advertisements and allows a customer or user to select alternative advertisements or additional alternative advertisements, such as targeted advertisements, during advertisement windows or periods.

Figure 2:
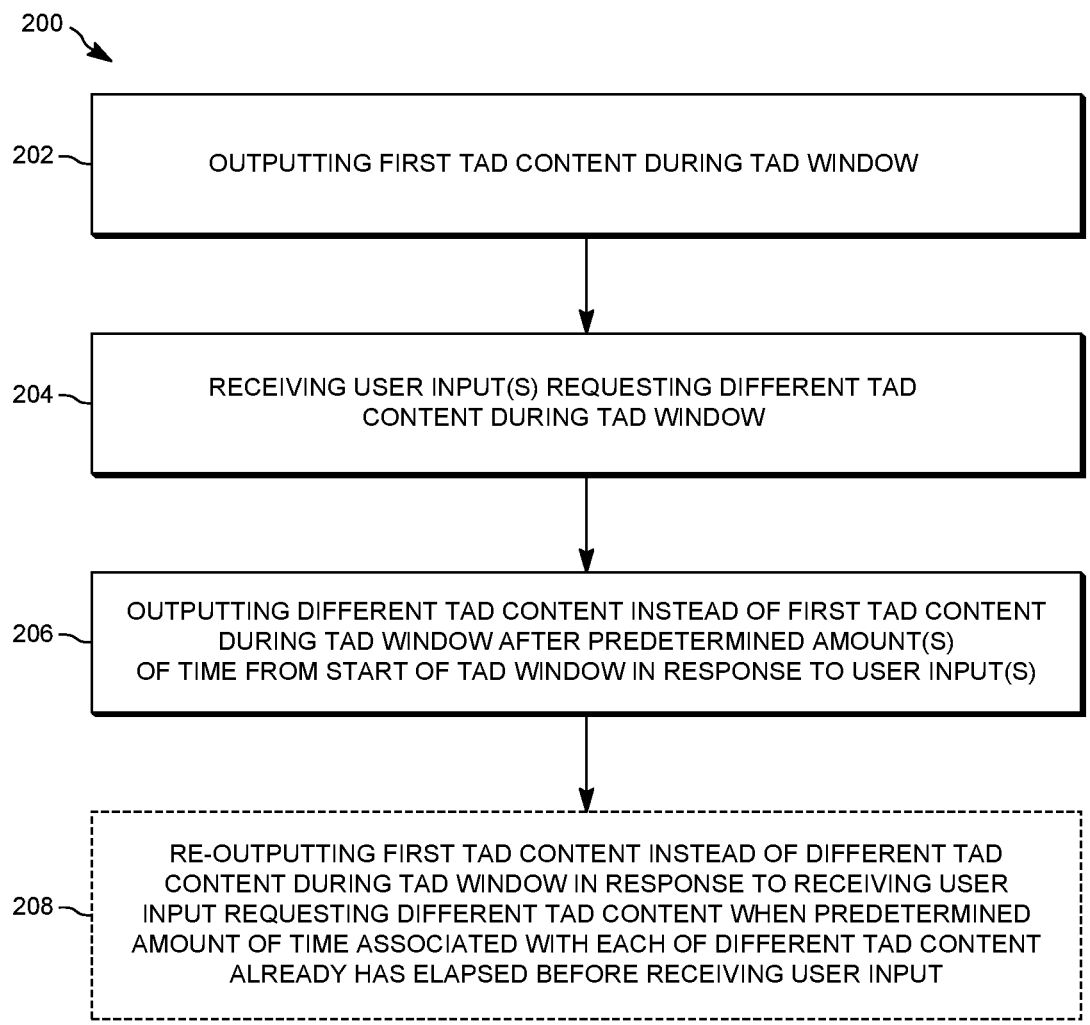
FIG. 2 is a flowchart illustrating an example of a process of providing alternative advertising content.

Referring to FIG. 2, a flowchart is shown of an example method or process 200 of providing alternative advertising content, which may be performed, for example, by MSO system 112, gateway 118, set top box 120, IP set top box 124, and/or one or more their components, such as advertising splice points component 113 and/or advertising management component 121 and/or 125. At 202, first TAD content is outputted during a TAD window of multimedia content, such as via set top box 120 or IP set top box 124. Prior to 202, the customer may be tuned to the content channel and multimedia content from that channel may be outputted. During the TAD window of the multimedia content, the first TAD content may be outputted instead of the multimedia content from the content channel. The first TAD content may include one or more advertisements targeted for the customer based, for example, on the customer's profile. The advertisements and the first TAD content may have a total duration that is the same as the duration of the TAD window.

At 204, at least one user input is received during the TAD window from the customer requesting different TAD content, such as via the graphical user interface of set top box 120 or set top box 124, and/or a remote control for the set top box or IP set top box. For example, the graphical user interface of set top box 120 or set top box 124 may include a "swap" or "switch" button to request different or alternative TAD content. In some embodiments, the user can click or select the button multiple times during the TAD window to view one or more alternative TAD content. Alternatively, a menu item in the graphical user interface may be selected or highlighted to request alternative TAD content.

At 206, different TAD content instead of the first TAD content is outputted during the TAD window in response to the user input(s). In some embodiments, the different TAD content may be outputted only after one or more predetermined amounts of time from the start or beginning of the TAD window. For example, the different TAD content may include a second TAD content and a third TAD content. The second TAD content may be outputted only, for example, after a first predetermined amount of time after the start of the TAD window and the third content may be outputted only, for example, after a second predetermined amount of time after the start of the TAD window. The second predetermined amount of time may be twice than the first predetermined amount of time, or may be more or less than twice the first predetermined amount of time. Although the different TAD content is described above to include second and third TAD content, other embodiments of method 200 may include different TAD content that includes only second TAD content (and not third TAD content), or includes fourth, fifth, sixth, or more TAD content which may be outputted after third, fourth, or fifth predetermined amounts of time.

In some embodiments, one or more of the different TAD content may be outputted based on when during the TAD window that the user input at step 204 is received. For example, when user input is received before the first predetermined amount of time after the start of the TAD window, the second TAD content may be outputted at 206. Additionally, or alternatively, when user input is received after the first predetermined amount of time after the start of the TAD window but before the second predetermined amount of time after the start of the TAD window, the third TAD content may be outputted at 206. The previously outputted TAD content may be described as only being partially outputted because the entire duration of that previous TAD content was not outputted. In some embodiments, outputting may skip one or more of the different TAD content, such as when user input is received after one or more predetermined amount of times. For example, when user input is received only after the first predetermined amount of time after the start of the TAD window but before the second predetermined amount of time after the start of the TAD window, method 200 may skip over the second TAD content and output the third TAD content instead of the first TAD content without at least partially outputting the second TAD content.

Method 200 may, in some embodiments, include at 208, outputting the first TAD content instead of the different TAD content during the TAD window in response to receiving user input requesting different TAD content but the user input is received after the predetermined amount of time associated with all of the different TAD content elapses. The first TAD content may be outputted at a predetermined amount of time after the start of the TAD window or may be outputted immediately after the user input is received. The first TAD content is outputted or re-outputted at a point of the first TAD content that chronologically corresponds to the TAD window. In other words, outputting or re-outputting the first TAD content at step 208 such that the first TAD content ends as planned during the TAD window. In the example above with the second and third TAD content, if user input is received after the second predetermined amount of time (regardless of whether user input(s) where received before the second predetermined amount of time), then the first TAD content is outputted. If the above user input is the only user input received during the TAD window, then the first TAD content remains outputted. When the TAD window has ended, multimedia content from the content channel is outputted. Although FIG. 2 shows particular steps for a process of providing alternative advertising content, other examples of the process may add, omit, replace, repeat, and/or modify one or more steps.

Figure 3:
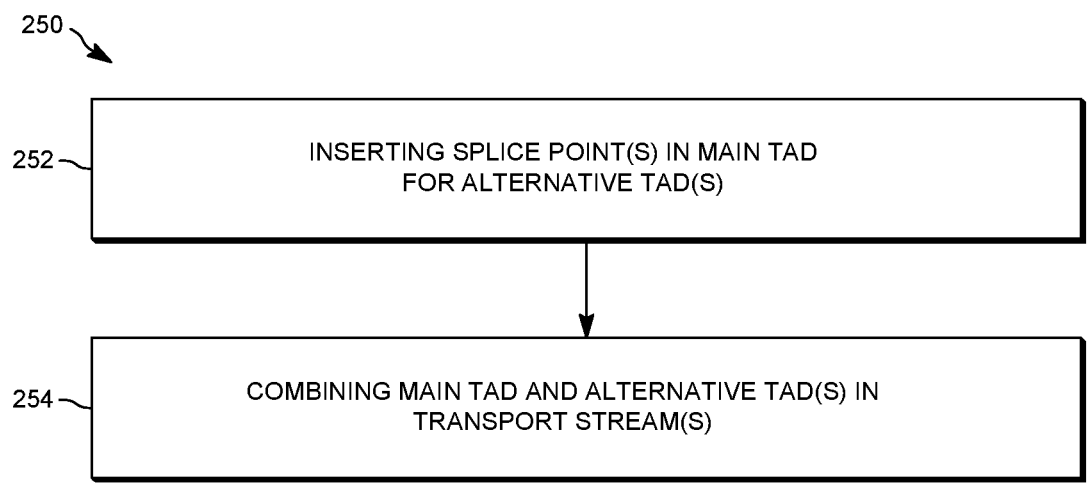
FIG. 3 is a flowchart illustrating another example of a process of providing alternative advertising content.

Referring to FIG. 3, a flowchart is shown of another example method or process 250 of providing alternative advertising content, which may be performed, for example, by MSO system 112 and/or one or more their components, such as advertising splice points component 113. At 252, one or more splice points are inserted in a main TAD for one or more alternative TADs. For example, a first splice point and a second splice point made be inserted in the main TAD for a first alternative TAD and a second alternative TAD. The first alternative TAD may have a duration that is the same as the duration of the main TAD from the first splice point to the end of the main TAD, while the second alternative TAD may have a duration that is the same as the duration of the main TAD from the second splice point to the end of the main TAD. In some embodiments, a third splice point may be inserted in the first alternative TAD for the second alternative TAD, and/or a fourth splice point may be inserted in the second alternative TAD for the remaining portion of the main TAD. Additional splice points may be inserted in the main TAD and the alternative TADs as desired. At 254, the main TAD and the alternative TAD(s) may be combined in one or more transport streams. Although FIG. 3 shows particular steps for a process of providing alternative advertising content, other examples of the process may add, omit, replace, repeat, and/or modify one or more steps.

Figure 4:
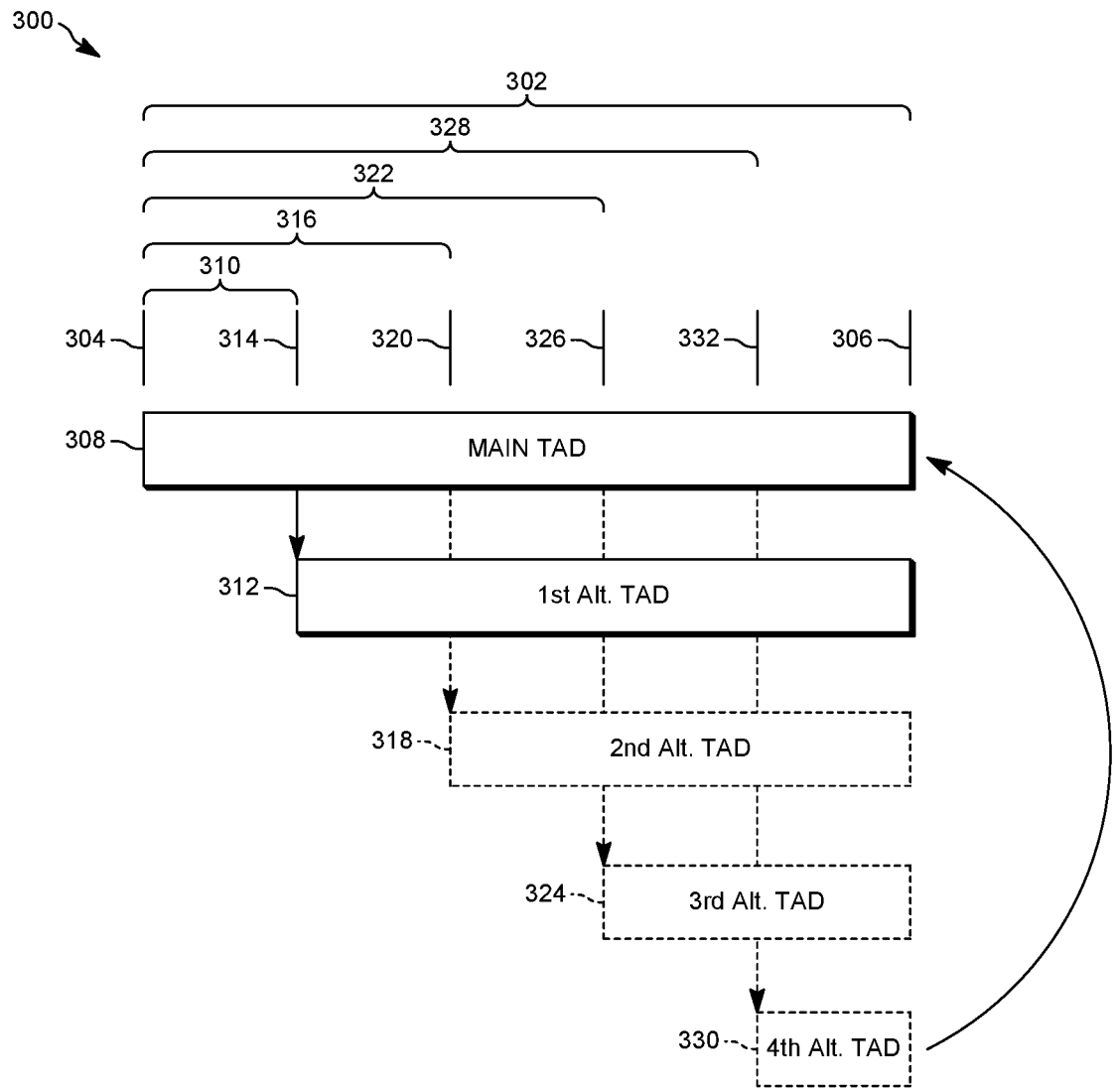
FIG. 4 is a block diagram of an example of a main advertisement and staggered alternative advertisement for an advertising window.

Referring to FIG. 4, a block diagram 300 that further illustrates methods 200 and 300 is shown. A TAD window 302 includes a start 304 of the TAD window and an end 306 of the TAD window. A main TAD 308 is outputted during TAD window 302 and has a duration that is the same duration as the TAD window. In other words, main TAD 308 has a duration that spans from the start and the end of the TAD window. However, other embodiments may include two or more main TADs that have a collective or total duration that is the same duration as the TAD window. If a user input is received during a first predetermined amount of time 310 from start 304 of TAD window 302 (or before the first predetermined amount of time elapses), then first alternative TAD 312 is outputted at a first moment or point 314 of the TAD window, which is the moment or point when the first predetermined amount of time elapses and there is a first splice point in the main TAD to introduce the first alternative TAD. The first alternative TAD has a duration that is the same duration of main TAD 308 minus the first predetermined amount of time (or a duration that is the same duration of the main TAD from first splice point 314 to end 306 of main TAD 308). In other words, the first alternative TAD has a staggered start or beginning compared to the main TAD but would still end at the same time as the main TAD.

If there is no other alternative TAD and user input is received after first predetermined amount of time 310, then main TAD 308 is outputted or re-outputted at a predetermined point during the TAD window based on when the user input is received. Alternatively, main TAD 308 may be re-outputted immediately after receiving the user input. The re-outputting of the main TAD is at a point of the main TAD that chronologically corresponds to the TAD window. In other words, when the main TAD is outputted or re-outputted, the main TAD will end as if the main TAD was the only TAD outputted.

If a user input is received after first predetermined amount of time 310 and/or before a second predetermined amount of time 316 from start 304 of TAD window 302 (or before the second predetermined amount of time elapses), then second alternative TAD 318 is outputted at a second moment or point 320 of the TAD window, which is the moment or point when the second predetermined amount of time elapses and there is a second splice point in the main TAD or a splice point in the first alternative TAD to introduce the second alternative TAD. The second alternative TAD has a duration that is the same duration of main TAD 308 minus the second predetermined amount of time (or a duration that is the same duration of the main TAD from second splice point 320 to end 306 of main TAD 308). In other words, the second alternative TAD has a staggered start or beginning compared to the main TAD and the first alternative TAD but would still end at the same time as the main TAD and the first alternative TAD. If there is no other alternative TAD and user input is received after second predetermined amount of time 316, then main TAD 308 is outputted or re-outputted at a predetermined point during the TAD window based on when the user input is received, as previously discussed.

If a user input is received after second predetermined amount of time 316 and/or before a third predetermined amount of time 322 from start 304 of TAD window 302 (or before the third predetermined amount of time elapses), then third alternative TAD 324 is outputted at a third moment or point 326 of the TAD window, which is the moment or point when the third predetermined amount of time elapses and there is a third splice point in the main TAD, or a splice point in the first or second alternative TAD, to introduce the third alternative TAD. The third alternative TAD has a duration that is the same duration of main TAD 308 minus the third predetermined amount of time (or a duration that is the same duration of the main TAD from third splice point 326 to end 306 of main TAD 308). In other words, the third alternative TAD has a staggered start or beginning compared to the main TAD and the first and second alternative TAD but would still end at the same time as the main TAD and the first and second alternative TADs. If there is no other alternative TAD and user input is received after third predetermined amount of time 322, then main TAD 308 is outputted or re-outputted at a predetermined point during the TAD window based on when the user input is received, as previously discussed.

If a user input is received after third predetermined amount of time 322 and/or before a fourth predetermined amount of time 328 from start 304 of TAD window 302 (or before the fourth predetermined amount of time elapses), then fourth alternative TAD 330 is outputted at a fourth moment or point 332 of the TAD window, which is the moment or point when the fourth predetermined amount of time elapses and there is a fourth splice point in the main TAD, or a splice point in the first, second, or third alternative TAD, to introduce the fourth alternative TAD. The fourth alternative TAD has a duration that is the same duration of main TAD 308 minus the fourth predetermined amount of time (or a duration that is the same duration of the main TAD from fourth splice point 332 to end 306 of main TAD 308). In other words, the fourth alternative TAD has a staggered start or beginning compared to the main TAD and the first, second, and third alternative TADs but would still end at the same time as the main TAD and the first, second, and third alternative TADs. If there is no other alternative TAD and user input is received after fourth predetermined amount of time 328, then main TAD 308 is outputted or re-outputted at a predetermined point during the TAD window based on when the user input is received, as previously discussed.

As shown in FIG. 4, the main TAD and the first, second, third, and fourth alternative TADs progressively decrease in playout time duration because of the staggered starts of the alternative TADs. The TADs may be in the same transport stream or may be in two or more different transport streams. The first, second, third, and/or fourth predetermined amounts of time are shown in FIG. 3 to have increasing durations, but the amount of increase may be the same or different between predetermined amounts of time. For example, the fourth predetermined amount of time may be twice the second predetermined amount of time, which may be twice the first predetermined amount of time. Alternatively, the fourth predetermined amount of time may be less or more than twice the second predetermined amount of time, which may be more or less than twice the first predetermined amount of time so long as the duration of the alternative advertisements are the same as the duration of the main TAD minus the corresponding predetermined amount of time.

As a specific example, the main TAD may be an advertisement for a sports utility vehicle. The first alternative TAD may be an advertisement for a sedan, while the second alternative TAD may be an advertisement for a hatchback. The third alternative TAD may be an advertisement for a couple, while the fourth alternative TAD may be an advertisement for a van. The above advertisements may be from the same advertiser or from two or more different advertisers. Additionally, although the above advertisements are advertisements for the same type of good (i.e., vehicle), the above advertisements may be for different types of goods and/or services.

Figure 5:
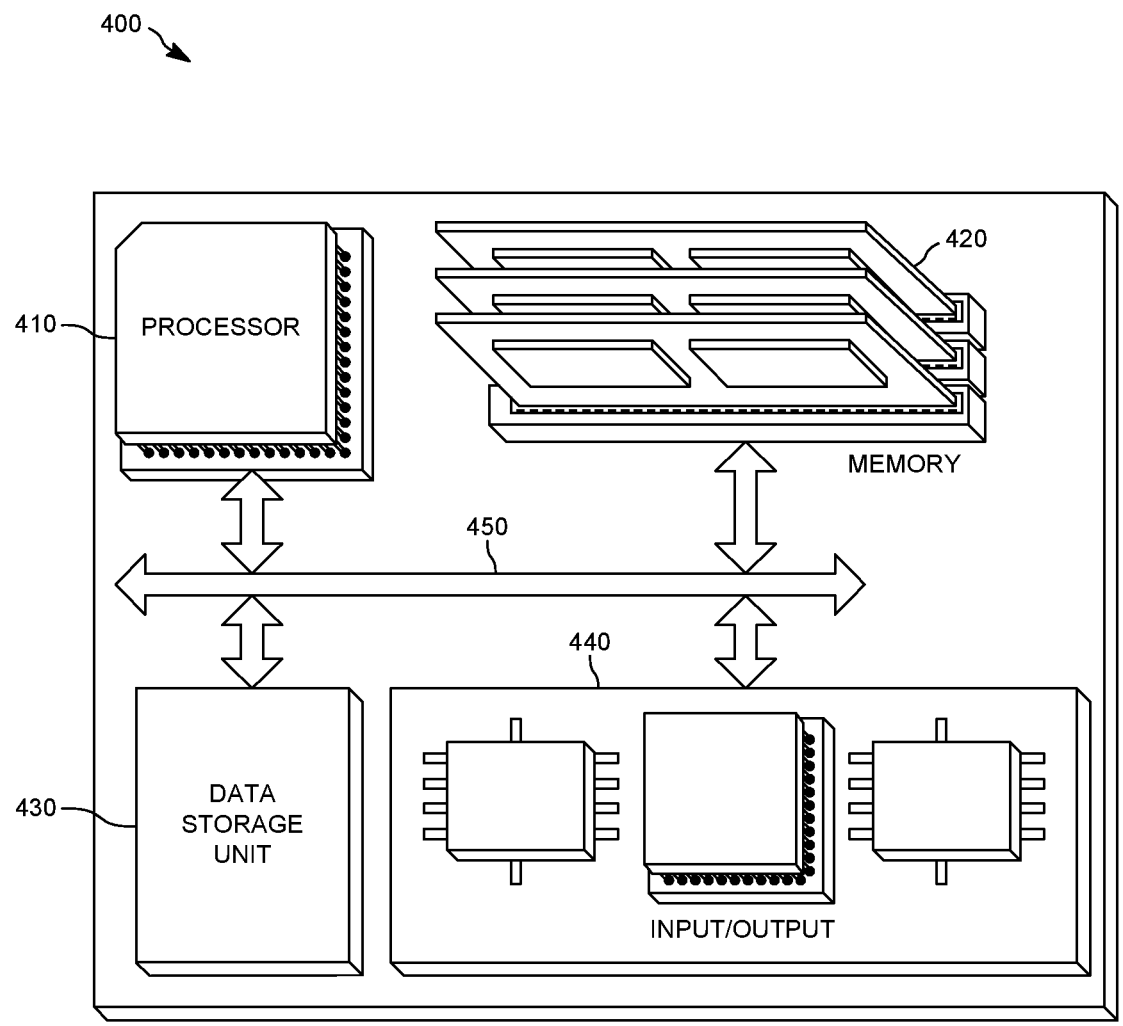
FIG. 5 is a block diagram of an example of a hardware configuration operable to manage advertising content.

Referring to FIG. 5, a hardware configuration 400 operable to facilitate automatically updating shared content is shown. The hardware configuration may be configured to implement or execute one or more of the processes performed by any of the various components, engines, modules, and devices described in the present disclosure, including MSO system 112, gateway 118, set top box 120, IP set top box 124, and/or advertisement management components 121 and/or 125. The hardware configuration 400 may include a processor 410, memory 420, a storage device 430, and an input/output device 440. Each of the components 410, 420, 430, and 440 may, for example, be interconnected using a system bus 450. The processor 410 may be capable of processing instructions for execution within the hardware configuration 400. In one implementation, the processor 410 may be a single-threaded processor. In another implementation, the processor 410 may be a multi-threaded processor. The processor 410 may be capable of processing instructions stored in the memory 420 or on the storage device 430.

The memory 420 may store information within the hardware configuration 400. In one implementation, the memory 420 may be a computer-readable medium. In one implementation, the memory 420 may be a volatile memory unit. In another implementation, the memory 420 may be a non-volatile memory unit. In some implementations, the storage device 430 may be capable of providing mass storage for the hardware configuration 400. In one implementation, the storage device 430 may be a computer-readable medium. In various different implementations, the storage device 430 may, for example, include a hard disk device, an optical disk device, flash memory or some other large capacity storage device. In other implementations, the storage device 630 may be a device external to the hardware configuration 400.

The input/output device 440 provides input/output operations for the hardware configuration 400. In embodiments, the input/output device 440 may include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device, IP device, mobile device, or other device. In embodiments, the input/output device may include driver devices configured to send communications to, and receive communications from an advertisement decision system, an advertisement media source, and/or a CDN.

The methods, systems, and apparatuses described in this disclosure enable the identification and retrieval of one or more preferred or requested media renditions of multimedia content. A subscriber device may maintain a list of media attributes preferred by the subscriber device and/or one or more users with access to the subscriber device, wherein the list includes preferred media attributes in order from the most requested/received attribute to the least requested/received attribute. When the subscriber device receives a request for multimedia content, the subscriber device may identify one or more media attributes preferred by the subscriber, and media renditions of the multimedia content in each of the identified attributes may be downloaded to the subscriber device.

The subject matter of this disclosure, and components thereof, may be realized by instructions that upon execution cause one or more processing devices to carry out the processes and functions described above. Such instructions may, for example, comprise interpreted instructions, such as script instructions, e.g., JavaScript or ECMAScript instructions, or executable code, or other instructions stored in a computer readable medium.

Implementations of the subject matter and the functional operations described in this specification may be provided in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a tangible program carrier for execution by, or to control the operation of, data processing apparatus.

A computer program (also known as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows may also be performed by, and apparatus may also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory may be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the claims below. For example, the actions recited in the claims may be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of providing alternative targeted advertising (TAD) content, comprising:
   outputting a first TAD content during a TAD window;
   receiving at least one user input requesting different TAD content during the TAD window; and
   outputting the different TAD content instead of the first TAD content during the TAD window after at least one predetermined amount of time from start of the TAD window in response to the at least one user input;
   where the different TAD content includes a second TAD content and a third TAD content, the second TAD content is different from the first and third TAD content, and the third TAD content is different from the first and second TAD content, wherein outputting the different TAD content instead of the first TAD content during the TAD window after at least one predetermined amount of time from start of the TAD window in response to the at least one user input includes outputting at least one of the second or third TAD content based on when the at least one user input is received during the TAD window.

2. The method of claim 1, wherein outputting at least one of the second or third TAD content based on when the at least one user input is received during the TAD window includes outputting the second TAD content after a first predetermined amount of time from start of the TAD window when the at least one user input is received before the first predetermined amount of time elapses.

3. The method of claim 2, wherein outputting at least one of the second or third TAD content based on when the at least one user input is received during the TAD window includes outputting the third TAD content after a second predetermined amount of time from start of the TAD window when the at least one user input is received before the second predetermined amount of time elapses, the second predetermined amount of time being more than the first predetermined amount of time.

4. The method of claim 2, wherein outputting at least one of the second or third TAD content based on when the at least one user input is received during the TAD window includes outputting the third TAD content instead of the first TAD content after a second predetermined amount of time from start of the TAD window when the at least one user input is received after the first predetermined amount of time elapses but before the second predetermined amount of time elapses, the second predetermined amount of time being more than the first predetermined amount of time.

5. The method of claim 4, wherein the second predetermined amount of time is twice the first predetermined amount of time.

6. The method of claim 4, wherein the second predetermined amount of time is more than twice the first predetermined amount of time.

7. The method of claim 4, wherein the second predetermined amount of time is less than twice the first predetermined amount of time.

8. The method of claim 1, wherein receiving at least one user input requesting different TAD content during the TAD window includes receiving a first user input requesting different TAD content before a first predetermined amount of time from start of the TAD window, and receiving a second user input requesting different TAD content before a second predetermined amount of time from start of the TAD window, the second predetermined amount of time being more than the first predetermined amount of time.

9. The method of claim 8, wherein outputting at least one of the second or third TAD content based on when the at least one user input is received during the TAD window includes outputting the second TAD content instead of the first TAD content after the first predetermined amount of time from start of the TAD window in response to the first user input and outputting the third TAD content instead of the second TAD content after the second predetermined amount of time from start of the TAD window in response to the second user input.

10. The method of claim 1, where the different TAD content includes only the second and third TAD content, wherein receiving at least one user input requesting different TAD content during the TAD window includes receiving a third user input requesting different TAD content after the second predetermined amount of time from start of the TAD window.

11. The method of claim 10, further comprising re-outputting the first TAD content instead of the different TAD content during the TAD window in response to the third user input.

12. A method of providing alternative targeted advertising (TAD) content, comprising:

outputting a first TAD content during a TAD window;

receiving at least one user input requesting different TAD content during the TAD window; and outputting the different TAD content instead of the first TAD content during the TAD window after at least one predetermined amount of time from start of the TAD window in response to the at least one user input;

re-outputting the first TAD content instead of the different TAD content during the TAD window in response to receiving user input requesting different TAD content when the predetermined amount of time associated with each of the different TAD content already has elapsed before receiving the user input.

13. A method of providing alternative advertising content, comprising:

inserting one or more splice points in a main TAD for one or more alternative TADs; and combining the main TAD and the one or more alternative TADs in at least one transport stream, wherein the one or more alternative TADs each has a duration that is the duration of the main TAD from one splice point of the one or more splice points to the end of the main TAD;

where the one or more alternative TADs include a first alternative TAD and a second alternative TAD, wherein inserting one or more splice points in a main TAD for one or more alternative TADs includes:

inserting a first splice point in the main TAD for the first alternative TAD, wherein the first alternative TAD has a duration that is the duration of the main TAD from the first splice point to the end of the main TAD; and inserting a second splice point separate from the first splice point in the main TAD for the second alternative TAD, wherein the second alternative TAD has a duration that is the duration of the main TAD from the second splice point to the end of the main TAD.

14. The method of claim 13, further comprising inserting a third splice point in the first alternative TAD for the second alternative TAD.

15. The method of claim 14, where the one or more alternative TADs include only a first alternative TAD and a second alternative TAD, further comprising inserting a fourth splice point in the second alternative TAD for a remaining portion of the main TAD.

16. The method of claim 13, wherein combining the main TAD and the one or more alternative TADs in a transport stream includes combining the main TAD, the first alternative TAD, and the second alternative TAD in the transport stream.

* * * * *